United States Patent
Huang

(10) Patent No.: US 7,068,283 B2
(45) Date of Patent: Jun. 27, 2006

(54) GAMMA CORRECTION ONLY GAIN/OFFSET CONTROL SYSTEM AND METHOD FOR DISPLAY CONTROLLER

(75) Inventor: Ming-Song Huang, Hsin-Chu (TW)

(73) Assignee: Etron Technology, Inc., Hsin-Chu (TW)

( * ) Notice: Subject to any disclaimer, the term of this patent is extended or adjusted under 35 U.S.C. 154(b) by 373 days.

(21) Appl. No.: 10/623,911

(22) Filed: Jul. 21, 2003

(65) Prior Publication Data
US 2005/0017989 A1  Jan. 27, 2005

(51) Int. Cl.
*G09G 5/00* (2006.01)

(52) U.S. Cl. .............. 345/602; 345/88; 345/600; 345/601; 345/605; 348/708; 348/807

(58) Field of Classification Search .......... 345/87, 345/88, 600, 601, 602, 605, 617; 348/674, 348/708, 807
See application file for complete search history.

(56) References Cited

U.S. PATENT DOCUMENTS

| | | | | |
|---|---|---|---|---|
| 4,769,703 A | * | 9/1988 | Osborne et al. | 348/189 |
| 5,282,036 A | * | 1/1994 | Worley et al. | 348/674 |
| 5,796,384 A | | 8/1998 | Kim | 345/147 |
| 5,818,935 A | * | 10/1998 | Maa | 380/200 |
| 5,987,167 A | | 11/1999 | Inoue | 382/167 |
| 6,246,070 B1 | * | 6/2001 | Yamazaki et al. | 257/40 |
| 6,271,822 B1 | | 8/2001 | Chiang | 345/99 |
| 6,388,648 B1 | | 5/2002 | Clifton et al. | 345/88 |
| 2001/0015774 A1 | * | 8/2001 | Endo et al. | 348/807 |
| 2002/0158885 A1 | * | 10/2002 | Brokenshire et al. | 345/611 |
| 2003/0128299 A1 | * | 7/2003 | Coleman et al. | 348/674 |
| 2005/0024382 A1 | * | 2/2005 | Ho et al. | 345/601 |

* cited by examiner

*Primary Examiner*—Bipin Shalwala
*Assistant Examiner*—Vincent E. Kovalick
(74) *Attorney, Agent, or Firm*—Saile Ackerman LLC; Stephen B. Ackerman

(57) ABSTRACT

A display controller provides luminance values to a display, where values for contrast and brightness for the display are constructed within a gamma correction mapping table. The display controller has an original gamma correction mapping table, a gamma correction transform circuit and a transformed gamma correction mapping table. The original gamma correction mapping table contains entries describing a default luminance value to be provided the display for a magnitude of a video input signal. The gamma correction transform circuit receives entries from the original gamma correction mapping table and from the contrast signal and brightness signal, transforms the entries to transformed luminance values. The transformed luminance values are placed in the transformed gamma correction mapping table. The transformed gamma correction mapping table receives a video signal that provides a pointer to the luminance values to be used to drive the display.

21 Claims, 7 Drawing Sheets

GAMMA CORRECTION ONLY GAIN/OFFSET CONTROL SYSTEM AND METHOD FOR DISPLAY CONTROLLER

BACKGROUND OF THE INVENTION

1. Field of the Invention

This invention relates generally to systems and methods for control of video displays. More particularly, this invention relates systems and methods that control of contrast and brightness of a video display.

2. Description of Related Art

Color video displays receive digital or analog signals that indicate the magnitude of the magnitude of the luminance of the primary colors employed by the display to create a color image. There are numerous standards that are known in the art that generate these signals for exciting materials within the display responsible for generating the light of the image. In cathode ray tubes (CRT), the light is emitted by phosphors deposited on a surface of the CRT. An electron gun is stimulated by the input analog signal to create the appropriate magnitude of emission of the light to create the color components of the image. In a liquid crystal display (LCD), a voltage is applied to a polymeric material which is twisted to cause polarization of light to be rotated. The level of the voltage determines the amount of rotation of the polarization and thus acts as to adjust the luminance of the light transfer through the LCD or reflected from the LCD. The standards for computer displays, as is known in the art, are particularly designed for use with CRT type displays and must be adapted for use with LCD displays.

Refer to FIG. 1 for a discussion of a circuit of the prior art employed to adapt a video signal to the necessary levels for driving an LCD panel. The video signal 5 is the analog voltage level indicating the luminance level that the display is to emit. The video signal 5 is received by a digital to analog-to-digital converter 10 and converted to a sampled digital number indicating the magnitude of the voltage of the video signal 5. The sampled digital value of the video signal is transferred from the analog-to-digital converter 10 to a scaling circuit 15. The scaling circuit 15 adjusts or normalizes the digital value of the video signal such that the range of the video signal encompasses the range of the voltage required for driving the LCD panel 45. The gain control signal 25 is a digital signal indicating the desired contrast level of the LCD panel. The scaled digital value of the video signal from the scaling circuit 15 and the gain control signal 25 are the inputs to a multiplier circuit 20. The gain control signal 25 being a multiplying factor for the scaled digital value of the video signal. The output of the multiplier circuit 20 being the product of the scaled digital value of the video signal and the gain control signal 25 is the input to the adder circuit 30. The offset control signal 35 is digital value indicating the desired brightness of the LCD panel 45. The offset control signal is added to the scaled and gain adjusted video signal to provide the desired level of luminance for the LCD panel. This value is really a pointer to a position within the gamma correction mapping table 40 representing the desired luminance of the LCD panel. It is known in the art that the function 42 of the relative luminance of the LCD panel to the drive voltage necessary to achieve the luminance is not linear. Further, providing a "Look-Up" table 40 of entries for this function is requires less computation resources and circuitry than direct calculation of the function. In the "Look-Up" table 40, the magnitude of the video signal for the desired relative luminance and the corresponding table entry is the value of the drive voltage required for the LCD panel 45 to emit light at the desired luminance.

The drive level (Z) is thus determined by the function:

$$Z = G\_orig((x*a)+b)$$

where:
  Z is the magnitude of the voltage necessary to drive the LCD panel 45.
  x is the voltage level of the video signal 40.
  a is the magnitude of the gain control signal 25.
  b is magnitude of the offset signal 35.
  G_orig is the function 42 as mapped in the gamma correction mapping table 45.

Refer now to FIG. 2 for a discussion of the operation of the circuit to adapt the video 5 signal for operation with the LCD panel 45. The digital value of the video signal 5 is applied to the multiplier circuit 20 to generate the scaled values 22 of the video signal. The scaling being the gain value (a). The adder circuit then adds the offset value (b) to generate the mapping values 32. The mapping values 32 act as pointers (Y) to the gamma correction mapping table 40. The values of the gamma function (G_orig) as recorded in the gamma correction mapping table 40 are extracted and applied as the drive signal (Z) 44 for the LCD panel 45.

The circuitry as described requires a physical multiplier and a physical adder. This adds complexity and consequently cost to a video display system. Further, the additional circuitry impacts performance of the video display system, particularly with higher resolution displays.

U.S. Pat. No. 5,796,384 (Kim) describes a gamma correction circuit of a liquid crystal display using a memory device. The gamma correction circuit compensates for the non-linear characteristics of gamma. The gamma correction circuit includes a memory device for storing programmed data. The programmed data is used to make gamma constant and to make the light transmissivity vary linearly with the input image data. The programmed data may be changed according to the characteristics of the liquid crystal being driven.

U.S. Pat No. 5,987,167 (Inoue) illustrates a color image display that includes an input color characteristic obtaining unit for obtaining input color characteristic data simultaneously with input of image data. The display has an input color characteristic data storage unit for storing the obtained input characteristic data. The display includes an image display device such as a CRT. A display color characteristic data storage unit stores the color characteristic of the image display device. A color transformation table generator creates a color transformation table and a color transforming circuit provides the color-transformation of the image data from selected color transformation tables.

U.S. Pat. No. 6,388,648 (Clifton, et al.) teaches an LCD projection unit. The LCD projection unit employs a luminance and color balance system. The luminance and color balance system employs an LCD array characterization lookup table that stores multiple sets of luminance and gamma correction values that are user selectable to control luminance and color balance. The lookup table values are determined by measuring the transfer function of the LCD array in the projection unit for each of a set of red ("R"), green ("G"), and blue ("B") input data values. The resulting S-curve responses are converted to corresponding sets of gamma responses and scaling the gamma responses to generate multiple R, G, and B families of luminance and gamma corrected values. Color balance is adjusted by selecting the particular R, G, and B families of luminance and gamma corrected values that cause the LCD projection unit to match a predetermined ratio of R, G, and B luminance values. Luminance is adjusted by selecting sets of families of R, G, and B, luminance values that maintain the color balance ratio while causing the LCD to transmit the desired overall luminance. The primary colors are adjusted by a method of color mixing implemented by a mathematical matrix algorithm that generates color modification coefficients for a color space conversion circuit. The primary color matching algorithm involves measuring the intrinsic colors coordinates of the primaries, determining a set of predetermined target coordinates, and performing matrix operations to calculate the coefficients used in the color space conversion circuit to convert the measured to the target coordinates, thereby matching the primary colors.

U.S. Pat. No. 6,271,822 (Chiang) describes a digital LCD driving circuit. The LCD driving circuit drives an LCD to display video images. The LCD driving circuit includes a digital gamma-correction and inversion circuit for performing a digital gamma-correction process on the digitized video signal and then performing a polarity inversion process on selected lines of the video signal. The digital gamma-correction and inversion circuit is coupled directly to a display memory unit so as to fetch the digitized video signal directly from the display memory unit. A digital-to-analog converter is coupled to the digital gamma-correction and inversion circuit for converting the digital output of the digital gamma-correction and inversion circuit into analog form. Further, the LCD driving circuit comprises an LCD timing control circuit, which is coupled to receive a plurality of video control signals associated with the digitized video signal, for converting the video control signals into an LCD timing control signal to control the LCD to display the video signal. Still further, the LCD driving circuit has a Pulse Width Modulator and shutdown circuit for supplying power to the LCD and shutting down the LCD when the LCD has been idle for a preset period.

SUMMARY OF THE INVENTION

An object of this invention is to provide a display controller for providing luminance values to a display.

Another object of this invention is to provide a display controller for providing a display controller where values for contrast and brightness for the display are constructed within a gamma correction mapping table.

To accomplish at least one of these and other objects, a display controller has an original gamma correction mapping table, a gamma correction transform circuit and a transformed gamma correction mapping table. The original gamma correction mapping table contains entries describing a default luminance value to be provided the display for a magnitude of a video input signal.

The gamma correction transform circuit is in communication with the original gamma correction mapping table to receive the entries and connected to receive a contrast signal and a brightness signal. From the contrast signal and brightness signal, the gamma correction transform circuit transforms the entries to transformed luminance values.

The transformed gamma correction mapping table is in communication with the gamma correction transform circuit to receive the transformed luminance values. The transformed gamma correction mapping table is further connected to receive a video signal, whereby the magnitude of the video signal provides a pointer to the luminance values to be used to drive the display.

The gamma correction transform circuit executes the function:

$$G\_new(i) = G\_orig((i*a)+b)$$

where:
- i is a counter representing potential magnitude values of the video signal,
- G_new(i) is the transformed value of the luminance value for an ith magnitude,
- a is a magnitude of the contrast signal, and
- b is a magnitude of the brightness signal.

Alternately, the gamma correction transform circuit executes the function:

$$G\_new(i) = G\_orig(C_i)$$

where:

$$C_i = b \quad | \quad i = 0$$
$$C_i = C_{i-1} + a \quad | \quad i > 0$$

- $C_i$ is a pointing variable to the luminance values in the original gamma correction mapping table,
- i is a counter representing potential magnitude values of the video signal,
- a is a magnitude of the contrast signal, and
- b is a magnitude of the brightness signal.

In a preferred embodiment of the display controller, the gamma correction transform circuit is a microcontroller and the original gamma correction mapping table and the transformed gamma correction mapping table are stored in a memory connected to the microcontroller. The microcontroller receives the contrast and brightness signals and then generates the transformed gamma correction mapping table from the original gamma correction mapping table and stores the transformed gamma correction mapping table in the memory. The microcontroller then receives the video signal determines the location within the memory containing appropriate luminance value and retrieves the value from the memory and transmits the value to the display.

DETAILED DESCRIPTION OF THE INVENTION

In the video control circuit of this invention, the default gamma correction mapping table is transformed by the contrast signal and brightness signal to create a transformed gamma correction mapping table. The video signal is used as the access pointer to access the contents of the transformed gamma correction mapping table. The contents of the transformed gamma correction mapping table represent the magnitude of the voltage that is used to drive the LCD display panel.

Figure 1:
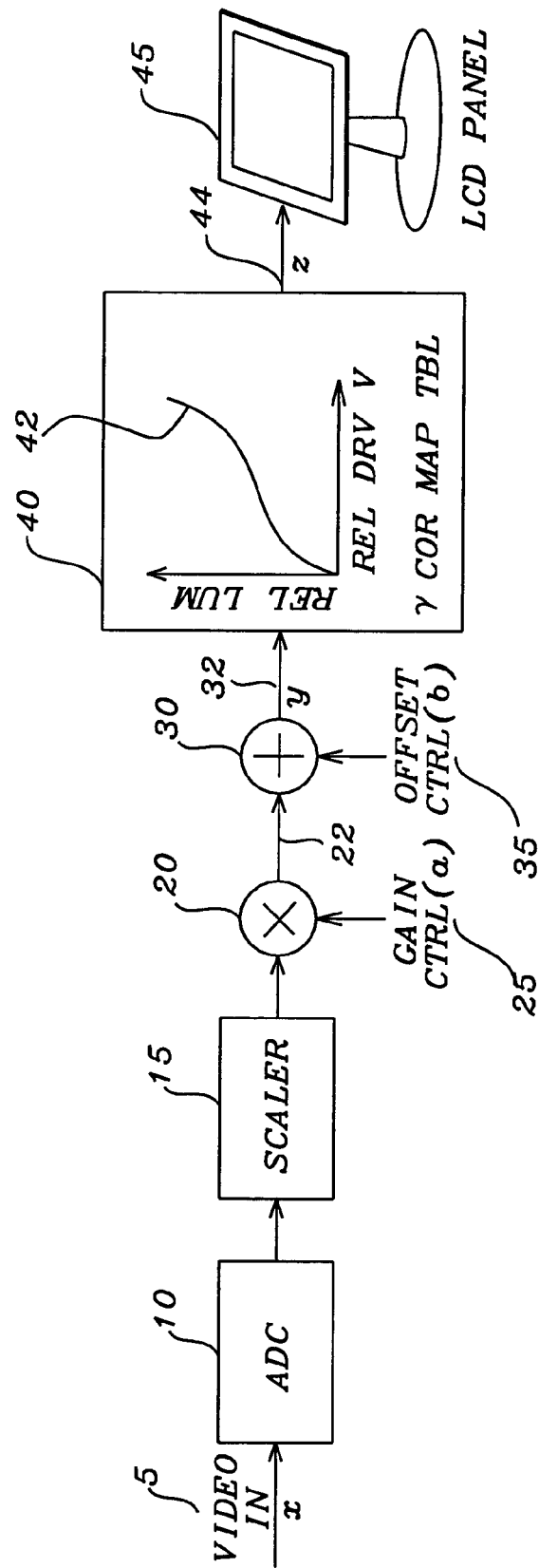
FIG. 1 is a functional block diagram of a display controller of the prior art.
Figure 2:
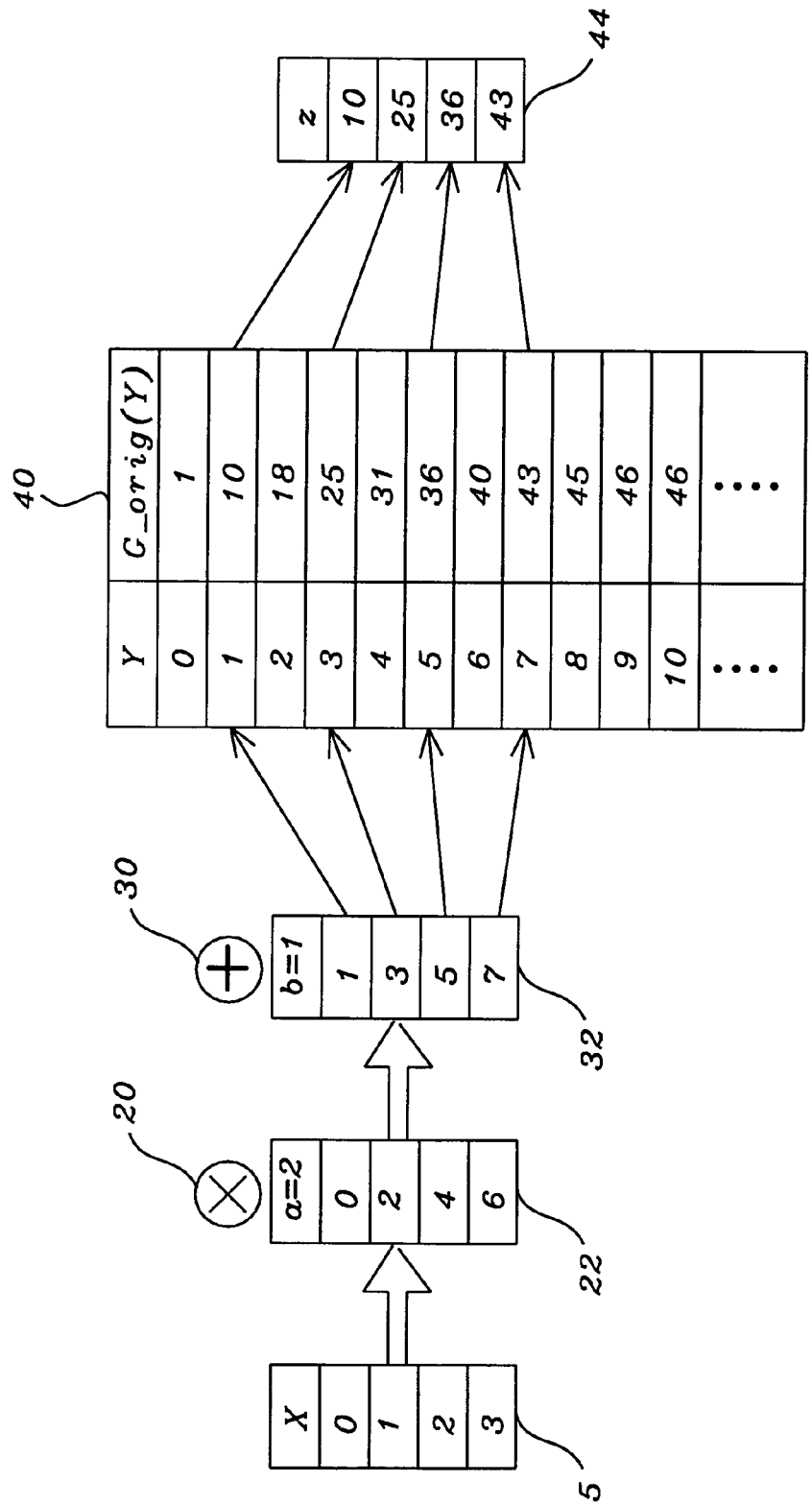
FIG. 2 is a diagram of the data transformation of the display controller of the prior art.
Figure 3:
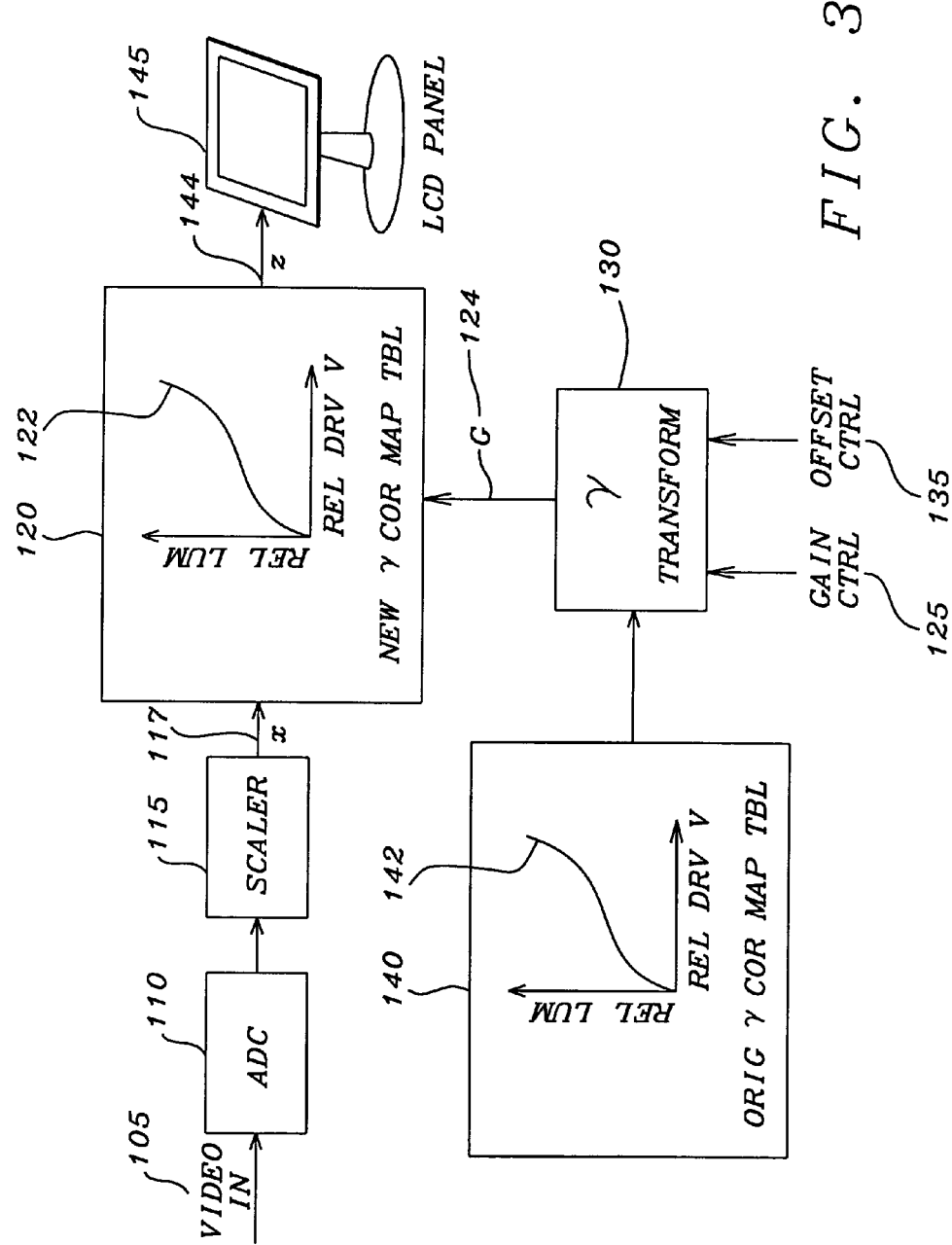
FIG. 3 is a functional block diagram of the display controller of this invention.

Refer now to FIG. 3 for a detailed description of the video control system of this invention. The video signal 105 is an analog voltage that represents the magnitude of the luminance desired to emanate from the display 145. The video signal 105 is the input to the analog-to-digital converter 110. The analog-to-digital converter 110 translates the video signal 105 to a sampled digital data representing the magnitude of the video signal 105. The digitized video signal that is the output of the analog-to-digital converter 110 is the input to the scaling circuit 115. The scaling circuit 115 adjusts or normalizes the digital value of the video signal 105 such that the range of the video signal encompasses the range of the voltage required for driving the LCD panel 145.

The digitized and scaled video signal 117 is the input to the transformed gamma correction mapping table 120. The digitized and scaled video signal 117 acts a pointer to the contents of the transformed gamma correction mapping table 120. The contents of the transformed gamma correction mapping table 120 are the digital values of the magnitude of the voltage to be applied to the LCD panel 145. The contents of the transformed gamma correction mapping table 122 define function 122 the relative luminance of the LCD panel 145 versus the magnitude of the driving voltage required to create the luminance of the LCD panel 145.

The contents of the transformed gamma correction mapping table 120 is further dependent on the magnitude of the gain control signal 125 for the contrast and the offset control signal 135 for the brightness of the LCD panel 145. The gain control signal 125 and the offset control signal 135 are inputs to the gamma transform circuit 130. The gamma transform circuit creates a counting variable (i) that simulates the value magnitude of the video signal and is varied over the range of the digitized and scaled video signal 117. The gain control signal 125 and the offset control signal 135 are combined to generate a pointer value for the original gamma correction mapping table 140. The contents of the pointer value are retrieved from the original gamma correction mapping table 140 and placed in the transformed gamma correction mapping table 120 in the location defined by the counting variable (i). The transformed gamma correction mapping table 120 then contains the value of luminance as changed by the gain control signal 125 to adjust the contrast and the offset control signal 135 to adjust the brightness of the LCD panel 145.

Figure 4:
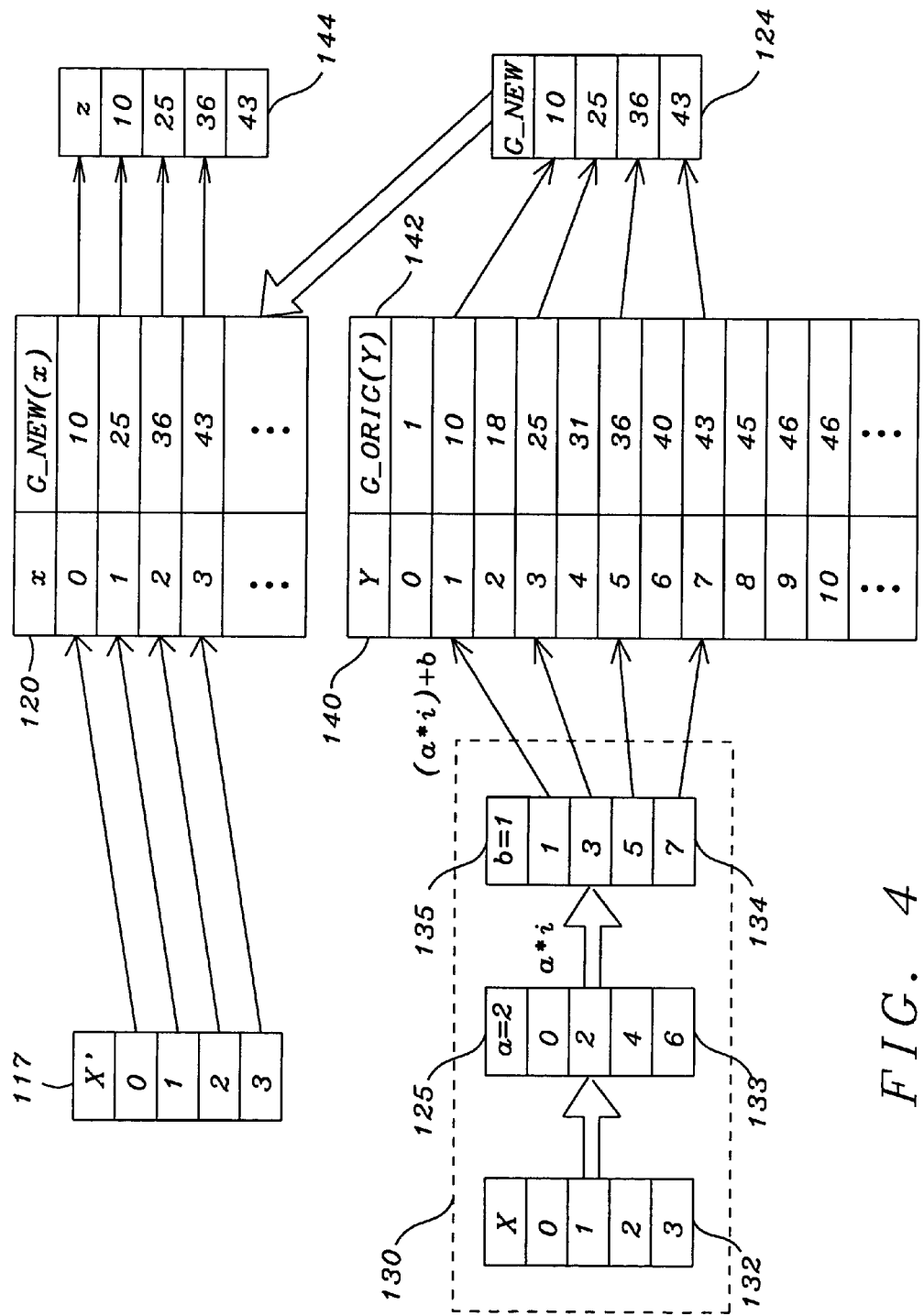
FIG. 4 is a diagram of the data transformation of the display controller of a first embodiment of this invention.

FIG. 4 provides an illustration of the data flow and operation of the display control system of this invention. The gamma transformation circuit has a count generator 132 that creates the counting variable (i). The gamma transform circuit 130 performs the multiply of the gain control signal 125 by each of the count variables (i) and then performs the addition to the offset control signal 135 to generate a pointer 134 to the location of the function 142 that defines the relative luminance versus the relative input voltage for the LCD panel 145. The contents of the original gamma correction mapping table 140 are transferred as the transformed gamma correction values 124 to the transformed gamma correction table 120.

The gamma correction transform circuit 130 the function 142 as shown above can be expressed as:

$$G\_new(i) = G\_orig((i*a)+b)$$

where:
i is the counting variable 132 representing potential magnitude values of the video signal,
G_new(i) is the transformed value of the luminance value for an ith magnitude,
a is a magnitude of the gain control signal 125, and
b is a magnitude of the offset control signal 135.

The calculation of the transformed gamma correction values occurs only with each change of the gain control signal 125 and the offset control signal 135. During operation the digitized and scaled input video signal 117 becomes the pointer to the locations of the transformed gamma correction mapping table 120. The locations pointed to by the and scaled input video signal 117 are transferred as the drive signal 144 to the LCD panel 145 for display.

Figure 5:
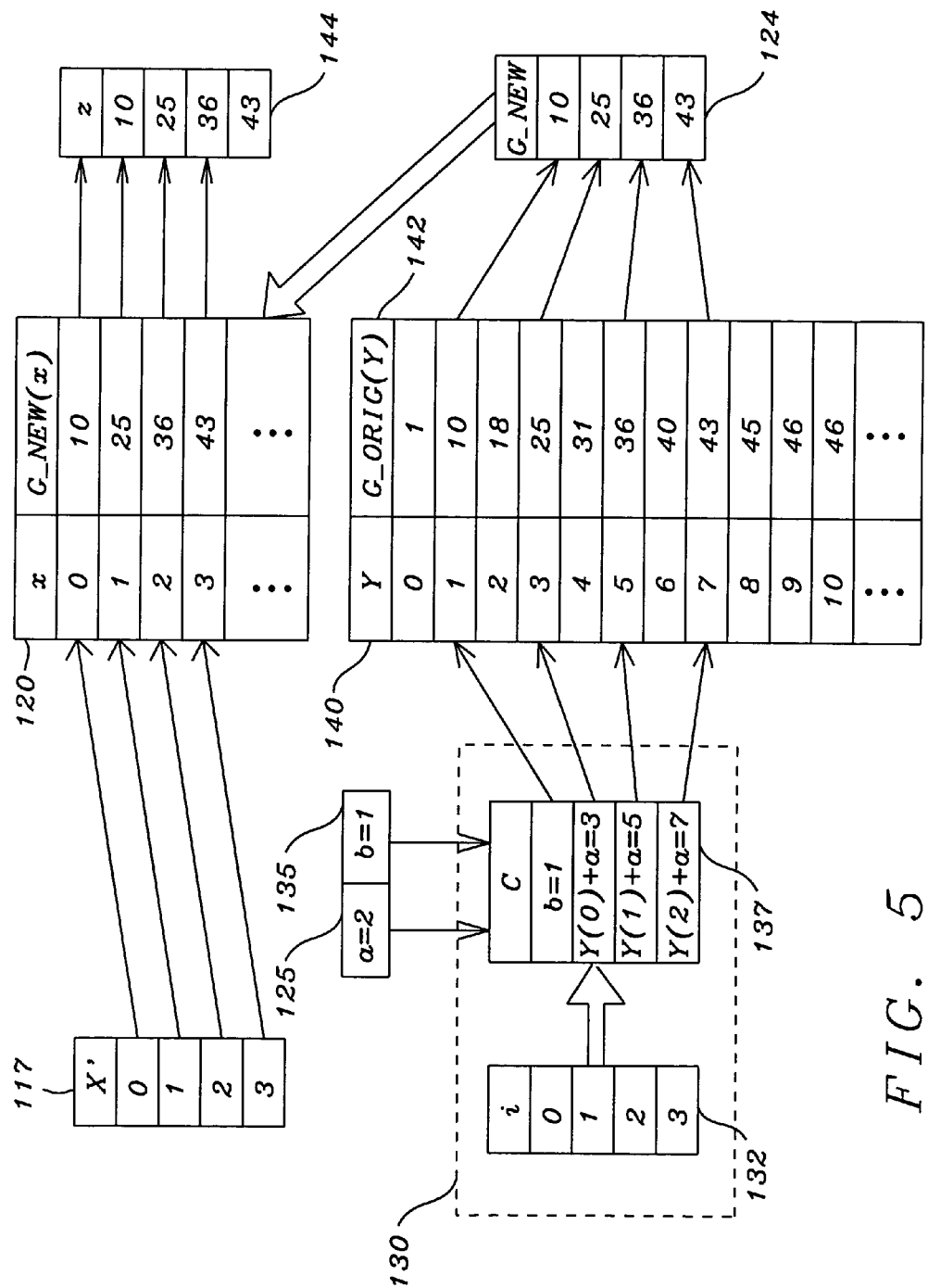
FIG. 5 is a diagram of the data transformation of the display controller of a first embodiment of this invention.

An alternate embodiment of the data flow and operation of the gamma transform circuit is shown in FIG. 5. In the first embodiment of this invention as described above, the gain control signal 125 is multiplied by the counter variable (i). In physical implementations, this requires complex multiplier circuits that require circuit excessive area to implement and consume a large amount of time. In the second embodiment, the function of the gamma transform circuit 130 is implemented as an adder. The gamma transform circuit 130 has the count generator 132 to generate the counting variable (i). The counting variable is transferred to the adder transform circuit 137 to generate the pointer values (Y) for the transformation. The adder transform circuit 137 receives the gain control signal 125 and the offset control signal 135 for the transformation. The transformation has the first counting variable 132 value (i=0) set to the value of the offset control signal 135 (in this example b=1). For each succeeding counting variable 132 value, the pointer value (Y) is equal to the previous pointer value added with the gain control signal 125 value (in this example a=2). The calculated pointer value is assigned a variable $C_i$ and the transformed luminance values are calculated according to the function:

$$G\_new(i) = G\_orig(C_i)$$

where:

$$C_i = b \quad | \quad i = 0$$
$$C_i = C_{i-1} + a \quad | \quad i > 0$$

$C_i$ is a calculated variable pointing to the luminance values in the original gamma correction mapping table,
i is the counting variable 132 representing potential magnitude values of the video signal,
a is a magnitude of the gain control signal 125, and
b is a magnitude of the offset control signal 135.

The calculated pointer ($C_i$) is the pointer value to the original gamma correction mapping table 140 and the gamma correction values 142 are extracted to form the transformed gamma correction values (G_NEW) 124. The transformed gamma correction values are then stored to the transformed gamma correction table 120. The digitized and scaled video signal 117 is applied as the pointers to the transformed gamma correction table 120 to generate the drive signal 117 for the LCD panel 145.

If the gain control signal 125 and/or the offset control signal 135 are set to the values of the default or original gamma correction mapping table 140. The transformed gamma correction mapping table 120 receives the non-transformed values of the luminance or the original gamma correction mapping table is used directly to receive the digitized and scaled video signal 117 and provide the luminance values. Either alternative is in keeping with the intent of this invention.

Figure 6:
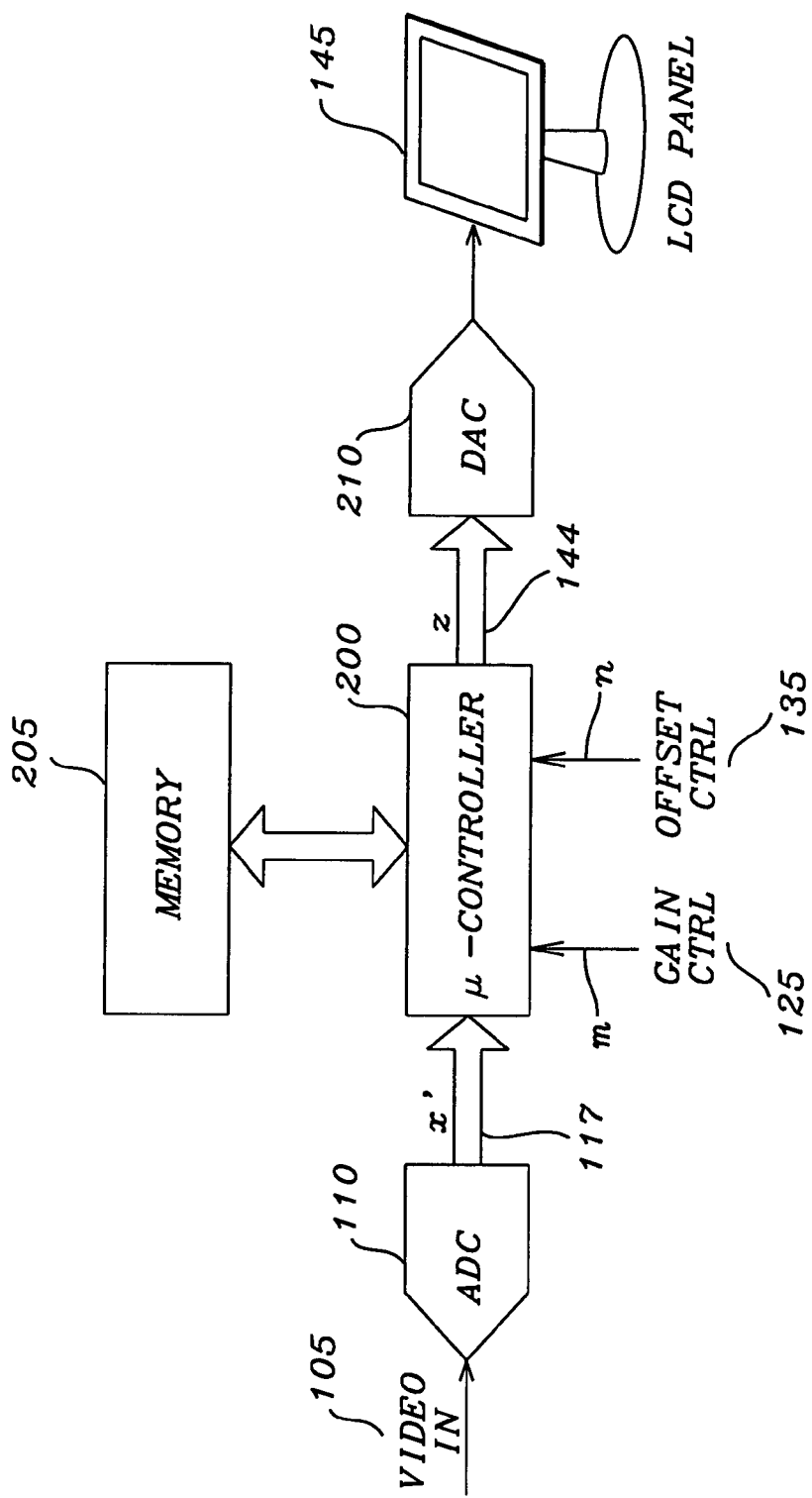
FIG. 6 is a block diagram of a display controller of this invention employing a microcontroller.

The gamma transform circuit 130 as described may be circuitry implemented as an integrated circuit have the multipliers or adders as described in the function of the circuit. However, a small microcontroller provides a cost effective alternative to the application specific design as described. A microcontroller, as is known in the art is a highly integrated chip that contains all the components comprising a computer controller. Typically this includes a central processing unit, random access memory, some form of read only memory, input/output ports, and timers. Referring now to FIG. 6 for a discussion of the implementation of the video control system with a microcontroller 200. The video signal 105, as described above, is an analog signal representing the value of luminance required to emanate from the LCD panel 145. The video signal 105 is applied to analog-to-digital converter 110 to create the sampled digitized video signal 117. In this case the scaling of the digitized video signal occurs within the microcontroller.

The gain control signal 125 and the offset control signal 135 are now digital data word respectively having m bits and n bits. The gain control signal 125 and the offset control signal 135 are applied to the microcontroller 200. The microcontroller 200 is connected to (or has included within the integrated circuit) the memory 205. The memory 205 contains the program code that is executed to provide the luminance values 144 dependent on the values of the digitized video signal 117, the gain control signal 125, and the offset control signal 135. Further, the memory 205 contains the original gamma correction mapping table and the transformed gamma correction mapping table.

As is known, the microcontroller has addition instructions and often multiply instructions and can thus implement the functions of the display control system as described in FIGS. 3–5. Often, instructions such as multiply are too complex for the microcontroller to execute in the desired time. An alternative to direct multiplication is a table-lookup where the operands act to pointers to locations within a table. The location within the table contains the resultant from the function performed on the operands. In the case of the gamma transform circuit 130, the implementation of the calculation of the variable pointing to the luminance values in the original gamma correction mapping table are the contents of a table resident within the memory 205. The gain control signal 125 and the offset control signal 135 are combined to calculate the address of the position within the table containing the value of the pointing variable. An alternative for the pointing variable is using the gain control signal 125 and the offset control signal 135 combined to create the address of the gamma correction values 142 rather than creating the pointing variable and then using the pointing variable to access the gamma correction values 142. The use of the calculation of the pointing variable by the gamma transform circuit 130 versus direct access of a table within the memory 205 becomes a tradeoff between the performance of the microcontroller 200 and the quantity of the memory 205.

The luminance signal 144 in this implementation is digital data transferred from the microcontroller 200 to the digital-to-analog converter 210. The digital-to-analog converter 200 provides an analog voltage that has an amplitude that is represented by the luminance signal 144. This voltage is value necessary to drive the LCD panel 145.

Figure 7:
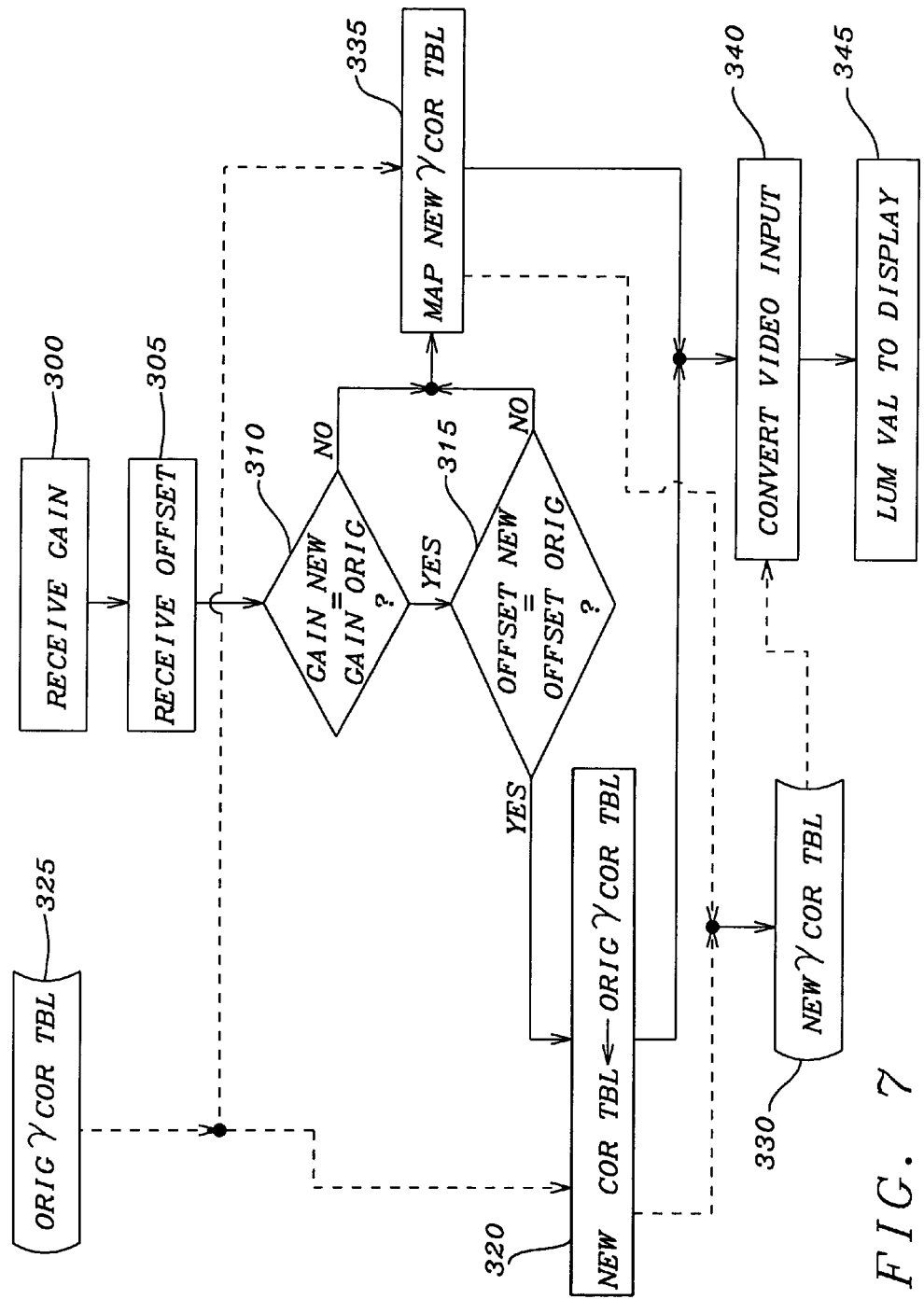
FIG. 7 is process flow diagram for controlling a display employing a gamma correction mapping table.

Refer to FIG. 7 for a description of a method for transforming gamma correction values of luminance for contrast and brightness. The method described hereinafter maybe implemented as a program for the microcontroller of FIG. 6. The program being stored in the memory as described. The memory for the program maybe random access memory or read only memory. Alternately, the memory may be magnetic storage devices or optical storage devices. Normally, microcontroller systems have the memory implemented as the random access memory or the read only memory, since these controllers are part of an embedded system and having a magnetic or optical storage devices consume too much space and are too costly.

The method begins with the reception of the gain control signal (Box 300) describing the contrast function of the display and the offset control signal (Box 305) describing the brightness function of the display. The received gain control signal is compared to the default gain control value (Box 310) and the offset control signal is compared to the default offset control value (Box 315). If the gain control signal and the offset control signal are equal to their default values, the transformed gamma correction mapping table 330 is set (Box 320) to the value original gamma correction table 325. This can be accomplished by literally copying the original gamma correction mapping table 325 to the transformed gamma correction mapping table 330 with no transform or by setting a pointer such that the original gamma correction mapping table 325 is used for the providing the luminance values.

If the gain control signal and/or the offset control signal are not equal to the default gain and offset values, the luminance values of the original gamma correction mapping table 325 are mapped (Box 335) to the transformed gamma correction mapping table 330. The input video signal is used as a pointer (Box 340) to select the luminance values in the transformed gamma correction table 330. The luminance values from the transformed gamma correction table 330 are transferred (Box 345) to the display.

The mapping (Box 335) of the values of the original gamma correction mapping table 325 to the transformed gamma correction mapping table 330 is as shown in FIGS. 4 or 5. FIG. 4 showing the mapping direct mapping employing the multiply function. Even in modern microcontroller integrated circuits, the multiply function requires excess resources and consumes an inordinate amount of time. The mapping of FIG. 5 employs a simple addition, which requires less resources and time and allows the use of a much simpler microcontroller.

While this invention has been particularly shown and described with reference to the preferred embodiments thereof, it will be understood by those skilled in the art that various changes in form and details may be made without departing from the spirit and scope of the invention.

The invention claimed is:

1. A display controller for providing a luminance value to a display comprising:

an original gamma correction mapping table containing entries describing a default luminance value to be provided to said display for a magnitude of a video input signal, said video input signal providing a default pointer to said default luminance values indicative of said magnitude;

a transformed gamma correction mapping table containing entries describing transformed luminance values to be provided to said display for said magnitude of said video input signal, said video input signal providing a transformed pointer to said transformed luminance values indicative of said magnitude, a gamma correction transform circuit that receives a new contrast signal and a new brightness signal, tests if the new contrast signal and the new brightness signal are respectively equivalent to a default contrast signal and a default brightness signal wherein:

if the new contrast signal is equivalent to the default contrast signal and the brightness signal is equivalent to the default brightness signal, said a gamma correction transform circuit is in communication with said default gamma correction mapping table to designate the default gamma correction mapping table for determining said luminance values for said display, if the new contrast signal is not equivalent to the default contrast signal and/or the brightness signal is not equivalent to the default brightness signal, said gamma correction transform circuit transforms entries of said default gamma correction mapping table as a function of the contrast signal and the brightness signal, wherein said gamma correction transform circuit is in communication with said transformed gamma correction mapping table to store said entries to said transformed gamma correction mapping table.

2. The display controller of claim 1 wherein the gamma correction transform circuit executes the function:

$$G\_new(i)=G\_orig((i*a)+b)$$

where:
i is a counter representing potential magnitude values of the video signal,
G_new(i) is the transformed value of the luminance value for an ith magnitude,
a is a magnitude of the contrast signal, and
b is a magnitude of the brightness signal.

3. The display controller of claim 1 wherein the gamma correction transform circuit executes the function:

$$G\_new(i)=G\_orig(C_i)$$

where:

$$C_i = b \quad | \quad i = 0$$
$$C_i = C_{i-1} + a \quad | \quad i > 0$$

$C_i$ is a pointing variable to the luminance values in the original gamma correction mapping table,
i is a counter representing potential magnitude values of the video signal,
a is a magnitude of the contrast signal, and
b is a magnitude of the brightness signal.

4. The display controller of claim 1 wherein the gamma correction transform circuit is a microcontroller.

5. The display controller of claim 4 wherein the microcontroller executes a program process that performs the function:

$$G\_new(i)=G\_orig((i*a)+b)$$

where:
i is a counter representing potential magnitude values of the video signal,
G_new(i) is the transformed value of the luminance value for an ith magnitude,
a is a magnitude of the contrast signal, and
b is a magnitude of the brightness signal.

6. The display controller of claim 4 wherein the microcontroller executes a program process that performs the function:

$$G\_new(i)=G\_orig(C_i)$$

where:

$$C_i = b \quad | \quad i = 0$$
$$C_i = C_{i-1} + a \quad | \quad i > 0$$

$C_i$ is a pointing variable to the luminance values in the original gamma correction mapping table,
i is a counter representing potential magnitude values of the video signal,
a is a magnitude of the contrast signal, and
b is a magnitude of the brightness signal.

7. The display controller of claim 4 wherein the original gamma correction mapping table is digital data stored in a memory.

8. The display controller of claim 7 wherein the transformed gamma correction mapping table is digital data stored in the memory.

9. A display control system for providing luminance values to a display comprising:

a microcontroller connected to receive a video signal, a contrast signal, and a brightness signal; and a memory in communication with the microcontroller to retain default gamma correction data and transformed gamma correction data;

said microcontroller executing a program process comprising the steps of:
receiving a new contrast signal,
receiving a new brightness signal,
testing if the new contrast signal and the new brightness signal are respectively equivalent to a default contrast signal and a default brightness signal,
if the new contrast signal is equivalent to the default contrast signal and the brightness signal is equivalent to the default brightness signal, designating the default gamma correction mapping table for determining a luminance value for said display,
if the new contrast signal is not equivalent to the default contrast signal and/or the brightness signal is not equivalent to the default brightness signal, transforming the default gamma correction mapping table as a function of the contrast signal and the brightness signal,
storing the transformed gamma correction mapping table to the memory, and
if the new contrast signal is equivalent to the default contrast signal and the brightness signal is equivalent to the default brightness signal, mapping the video signal to determine the luminance level from the default gamma correction mapping table,
if the new contrast signal is not equivalent to the default contrast signal and/or the brightness signal is not equivalent to the default brightness signal, mapping the video signal to determine the luminance level from the transformed gamma correction mapping table, generating a luminance signal from the luminance level, and transferring the luminance signal to the display.

10. The display control system of claim 9 wherein the function is:

$$G\_new(i)=G\_orig((i*a)+b)$$

where:
 i is a counter representing potential magnitude values of the video signal,
 G_new(i) is the transformed value of the luminance value for an ith magnitude,
 a is a magnitude of the contrast signal, and
 b is a magnitude of the brightness signal.

11. The display control system of claim 9 wherein the function is:

$$G\_new(i)=G\_orig(C_i)$$

where:

$$C_i = b \quad | \quad i = 0$$
$$C_i = C_{i-1} + a \quad | \quad i > 0$$

$C_i$ is a pointing variable to the luminance values in the original gamma correction mapping table,
i is a counter representing potential magnitude values of the video signal,
a is a magnitude of the contrast signal, and
b is a magnitude of the brightness signal.

12. A method for providing luminance value to a display comprising the steps of:
 receiving a new contrast signal,
 receiving a new brightness signal,
 testing if the new contrast signal and the new brightness signal are respectively equivalent to a default contrast signal and a default brightness signal,
 if the new contrast signal is equivalent to the default contrast signal and the brightness signal is equivalent to the default brightness signal, designating the default gamma correction mapping table for determining a luminance value for said display,
 if the new contrast signal is not equivalent to the default contrast signal and/or the brightness signal is not equivalent to the default brightness signal, transforming the default gamma correction mapping table as a function of the contrast signal and the brightness signal,
 storing the transformed gamma correction mapping table to the memory, and
 if the new contrast signal is equivalent to the default contrast signal and the brightness signal is equivalent to the default brightness signal, mapping the video signal to determine the luminance level from the default gamma correction mapping table,
 if the new contrast signal is not equivalent to the default contrast signal and/or the brightness signal is not equivalent to the default brightness signal, mapping the video signal to determine the luminance level from the transformed gamma correction mapping table,
 generating a luminance signal from the luminance level, and
 transferring the luminance signal to the display.

13. The method of claim 12 wherein the function is:

$$G\_new(i)=G\_orig((i*a)+b)$$

where:
 i is a counter representing potential magnitude values of the video signal,
 G_new(i) is the transformed value of the luminance value for an ith magnitude,
 a is a magnitude of the contrast signal, and
 b is a magnitude of the brightness signal.

14. The method of claim 12 wherein the function is:

$$G\_new(i)=G\_orig(C_i)$$

where:

$$C_i = b \quad | \quad i = 0$$
$$C_i = C_{i-1} + a \quad | \quad i > 0$$

$C_i$ is a pointing variable to the luminance values in the original gamma correction mapping table,
i is a counter representing potential magnitude values of the video signal,
a is a magnitude of the contrast signal, and
b is a magnitude of the brightness signal.

15. An apparatus for providing luminance value to a display comprising the steps of:
 means for receiving a new contrast signal,
 means for receiving a new brightness signal,
 means for testing if the new contrast signal and the new brightness signal are respectively equivalent to a default contrast signal and a default brightness signal,
 means for designating the default gamma correction mapping table for determining a luminance value for said display, if the new contrast signal is equivalent to the default contrast signal and the brightness signal is equivalent to the default brightness signal,
 means for transforming the default gamma correction mapping table as a function of the contrast signal and the brightness signal, if the new contrast signal is not equivalent to the default contrast signal and/or the brightness signal is not equivalent to the default brightness signal,
 means for storing the transformed gamma correction mapping table to the memory, and
 means for mapping the video signal to determine the luminance level from the default gamma correction mapping table, if the new contrast signal is equivalent to the default contrast signal and the brightness signal is equivalent to the default brightness signal,
 means for mapping the video signal to determine the luminance level from the transformed gamma correction mapping table, if the new contrast signal is not equivalent to the default contrast signal and/or the brightness signal is not equivalent to the default brightness signal,
 means for generating a luminance signal from the luminance level, and
 means for transferring the luminance signal to the display.

16. The apparatus of claim 15 wherein the function is:

$$G\_new(i)=G\_orig((i*a)+b)$$

where:
 i is a counter representing potential magnitude values of the video signal, G_new(i) is the transformed value of the luminance value for an ith magnitude, a is a magnitude of the contrast signal, and b is a magnitude of the brightness signal.

17. The apparatus of claim 15 wherein the function is:

$$G\_new(i)=G\_orig(C_i)$$

where:

$$C_i = b \quad | \quad i = 0$$
$$C_i = C_{i-1} + a \quad | \quad i > 0$$

$C_i$ is a pointing variable to the luminance values in the original gamma correction mapping table, i is a counter representing potential magnitude values of the video signal, a is a magnitude of the contrast signal, and b is a magnitude of the brightness signal.

18. A medium for retaining a computer program which, when executed on a computing system, executes process for providing luminance value to a display comprising the steps of:

receiving a new contrast signal, receiving a new brightness signal, testing if the new contrast signal and the new brightness signal are respectively equivalent to a default contrast signal and a default brightness signal, if the new contrast signal is equivalent to the default contrast signal and the brightness signal is equivalent to the default brightness signal, designating the default gamma correction mapping table for determining a luminance value for said display, if the new contrast signal is not equivalent to the default contrast signal and/or the brightness signal is not equivalent to the default brightness signal, transforming the default gamma correction mapping table as a function of the contrast signal and the brightness signal, storing the transformed gamma correction mapping table to the memory, and if the new contrast signal is equivalent to the default contrast signal and the brightness signal is equivalent to the default brightness signal, mapping the video signal to determine the luminance level from the default gamma correction mapping table, if the new contrast signal is not equivalent to the default contrast signal and/or the brightness signal is not equivalent to the default brightness signal, mapping the video signal to determine the luminance level from the transformed gamma correction mapping table, generating a luminance signal from the luminance level, and transferring the luminance signal to the display.

19. The medium of claim 18 wherein the function is:

$$G\_new(i)=G\_orig((i*a)+b)$$

where:

i is a counter representing potential magnitude values of the video signal,

G_new(i) is the transformed value of the luminance value for an ith magnitude, a is a magnitude of the contrast signal, and b is a magnitude of the brightness signal.

20. The medium of claim 18 wherein the function is:

$$G\_new(i)=G\_orig(C_i)$$

where:

$$C_i = b \quad | \quad i = 0$$
$$C_i = C_{i-1} + a \quad | \quad i > 0$$

$C_i$ is a pointing variable to the luminance values in the original gamma correction mapping table, i is a counter representing potential magnitude values of the video signal, is a magnitude of the contrast signal, and b is a magnitude of the brightness signal.

21. The medium of claim 18 wherein said medium is selected from the program storage medium consisting of random access memory, read only memory, magnetic storage devices, and optical storage devices.

* * * * *